US011671410B2

(12) United States Patent
Fandridi et al.

(10) Patent No.: US 11,671,410 B2
(45) Date of Patent: Jun. 6, 2023

(54) PROVIDING ENRICHMENT INFORMATION USING HYPERTEXT TRANSFER PROTOCOL SECURE (HTTPS)

(71) Applicant: UPSTREAM MOBILE COMMERCE LIMITED, London (GB)

(72) Inventors: Christini Fandridi, London (GB); Nikolaos Kotzalas, London (GB); Apostolos Katidiotis, London (GB); Natalia Mila, London (GB)

(73) Assignee: UPSTREAM MOBILE COMMERCE LIMITED, London (GB)

( * ) Notice: Subject to any disclaimer, the term of this patent is extended or adjusted under 35 U.S.C. 154(b) by 0 days.

(21) Appl. No.: 17/867,208

(22) Filed: Jul. 18, 2022

(65) Prior Publication Data

US 2022/0353249 A1 Nov. 3, 2022

Related U.S. Application Data

(63) Continuation of application No. PCT/IB2021/060969, filed on Nov. 25, 2021.

(30) Foreign Application Priority Data

Dec. 9, 2020 (ZA) .................. 2020/07650

(51) Int. Cl.
*H04L 9/40* (2022.01)
*H04L 67/1001* (2022.01)
*H04L 67/02* (2022.01)

(52) U.S. Cl.
CPC ........ *H04L 63/0428* (2013.01); *H04L 63/166* (2013.01); *H04L 67/02* (2013.01); *H04L 67/1001* (2022.05)

(58) Field of Classification Search
CPC ............... H04L 63/0428; H04L 63/166; H04L 67/1001; H04L 67/02
(Continued)

(56) References Cited

U.S. PATENT DOCUMENTS 11,563,733 B2 * 1/2023 Furman ................ H04L 9/3247
2010/0049850 A1 * 2/2010 Nanduri ................ H04L 63/166
709/225

(Continued)

FOREIGN PATENT DOCUMENTS

CN 110535879 A * 12/2019
CN 110535879 A 12/2019
(Continued)

OTHER PUBLICATIONS

Vallina-Rodriguez et al., "Header Enrichment or ISP Enrichment? Emerging Privacy Threats in Mobile Networks," *Hot Topics in Middleboxes and Network Function Virtualization*, pp. 25-30 (Aug. 21, 2015).

(Continued)

*Primary Examiner* — Tauqir Hussain
(74) *Attorney, Agent, or Firm* — Leydig, Voit & Mayer, Ltd.

(57) ABSTRACT

A computer-implemented method and a system are provided for providing enrichment information using Hypertext Transfer Protocol Secure (HTTPS). The method includes: extracting and storing enrichment information received in a client handshake initiator packet for negotiating an encryption protocol for a network session of a Hypertext Transfer Protocol Secure (HTTPS) packet stream at a termination of a security protocol in a network; and obtaining one or more Hypertext Transfer Protocol (HTTP) requests by decrypting the Hypertext Transfer Protocol Secure (HTTPS) packet stream of the network session, and adding the enrichment (Continued)

information as a header to at least the first HTTP request being routed towards a server.

30 Claims, 11 Drawing Sheets

(58) Field of Classification Search
USPC .................................................. 713/168
See application file for complete search history.

(56) References Cited

U.S. PATENT DOCUMENTS

| | | | | |
|---|---|---|---|---|
| 2012/0184258 A1* | 7/2012 | Kovvali | ................ | H04L 67/568 |
| | | | | 455/418 |
| 2014/0310392 A1* | 10/2014 | Ho | .......................... | H04L 67/02 |
| | | | | 709/223 |
| 2015/0348059 A1* | 12/2015 | Agara | ................ | G06Q 30/0201 |
| | | | | 705/7.29 |
| 2016/0065644 A1* | 3/2016 | Kant | .................... | H04W 80/08 |
| | | | | 709/203 |
| 2016/0094581 A1* | 3/2016 | Kasbekar | .............. | H04L 63/166 |
| | | | | 713/151 |
| 2017/0026481 A1* | 1/2017 | Stephan | .............. | H04L 63/0281 |
| 2019/0182250 A1* | 6/2019 | Kiester | ............... | H04L 63/0428 |
| 2019/0273794 A1 | 9/2019 | Gochi Garcia | | |
| 2019/0289007 A1* | 9/2019 | Zhang | .................... | H04L 63/08 |
| 2019/0312878 A1 | 10/2019 | Brown et al. | | |
| 2020/0314189 A1 | 10/2020 | Pillers et al. | | |
| 2021/0226951 A1* | 7/2021 | Goldstein | ............. | H04L 63/107 |
| 2022/0201090 A1* | 6/2022 | Håkansson | ............. | H04L 67/02 |
| 2022/0248228 A1* | 8/2022 | Mattsson | ............... | H04W 12/08 |

FOREIGN PATENT DOCUMENTS

| | | | | |
|---|---|---|---|---|
| WO | WO 2020/228968 A1 | | 11/2020 | |
| WO | WO-2020228968 A1 * | | 11/2020 | ............. H04L 12/66 |
| WO | WO-2022123384 A1 * | | 6/2022 | |

OTHER PUBLICATIONS

European Aptent Office, International Search Report in International Patent Application No. PCT/IB2021/060969 (dated Jan. 27, 2022).

* cited by examiner

PROVIDING ENRICHMENT INFORMATION USING HYPERTEXT TRANSFER PROTOCOL SECURE (HTTPS)

CROSS-REFERENCE TO RELATED APPLICATION

This application is a continuation of International Application No. PCT/IB2021/060969, filed on Nov. 25, 2021, which claims priority to South African Provisional Patent Application No. 2020/07650, filed on Dec. 9, 2020. The disclosures of the aforementioned applications are hereby incorporated by reference in their entireties.

FIELD OF THE INVENTION

This invention relates to providing enrichment information using Hypertext Transfer Protocol Secure (HTTPS).

BACKGROUND TO THE INVENTION

Hypertext Transfer Protocol (HTTP) is an application layer protocol for information services that functions as a request-response protocol in client-server computing models, such as a web browser client and a web server hosting a website or web application. HTTP header fields are components of the header section of HTTP requests and responses, which may be used for standardized fields and non-standardized fields.

Header enrichment is the process of adding data fields in the header of an HTTP request for use by downstream servers. Header enrichment is a prevalent mechanism through which web servers identify a subscriber or a mobile device, for example, the Mobile Station International Subscriber Directory Number (MSISDN) (i.e. a cell phone number), of users when receiving requests through a network of a Mobile Network Operator (MNO). Header enrichment may also be used in non-mobile HTTP requests where other data is used for identification or other purposes.

In a mobile network, header enrichment can be used by the MNO to provide the MSISDN of the user when they visit a specific domain/Internet Protocol (IP) address through their mobile network. For each HTTP request that targets the aforementioned domain/IP address through the network of the MNO, the MNO modifies the request on the application level and enhances it with an HTTP header that contains the MSISDN of the user before routing the enhanced request to the target server.

Although header enrichment is the prevalent practice for resolving the MSISDN of users through the MNO network, its drawback is that it can only work through plain HTTP and not when HTTP Secure (HTTPS) encrypted using Transport Layer Security (TLS) is used. HTTPS packets are encrypted and, as a result, MNOs cannot add headers on the application level as they do in HTTP. As a secure protocol, HTTPS disallows any modification of HTTP requests like those performed in header enrichment.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to an aspect of the present invention there is provided a computer-implemented method for providing enrichment information using Hypertext Transfer Protocol Secure (HTTPS), the method comprising: extracting and storing enrichment information received in a client handshake initiator packet for negotiating an encryption protocol for a network session of a Hypertext Transfer Protocol Secure (HTTPS) packet stream at a termination of a security protocol in a network; and obtaining one or more Hypertext Transfer Protocol (HTTP) requests by decrypting the Hypertext Transfer Protocol Secure (HTTPS) packet stream of the network session, and adding the enrichment information as a header to at least the first HTTP request being routed towards a server.

The method may include receiving, at the termination of the security protocol in the network, the client handshake initiator packet, the client handshake initiator packet being for negotiating the encryption protocol for the network session of the HTTPS packet stream, and the client handshake initiator packet including the enrichment information.

Extracting enrichment information may include reading an extension field of the client handshake initiator packet and storing enrichment information may include storing the enrichment information in a session table with correlation information for the enrichment information. The method may include storing the enrichment information temporarily in the session table for a duration configured to include a duration of the network session. The correlation information may be session specific information identifying an owner of the client handshake initiator packet. The session table may hold key-value pairs, where the key is a unique combination of a source Internet Protocol address and source port, and the value is the enrichment information.

The method may include removing the enrichment information from a payload of the client handshake initiator packet and adjusting field lengths before carrying out a security handshake.

The enrichment information may be received in a Transport Layer Security (TLS) extension of an unencrypted part of a client TLS handshake initiator packet negotiating a TLS protocol for the network session.

The method may include converting the enrichment information to a readable format before adding the enrichment information as a header to at least the first HTTP request being routed towards the server. Storing enrichment information may include storing the converted enrichment information.

The method may include providing a component at a security protocol termination for extracting and storing enrichment information and obtaining one or more HTTP requests, and wherein adding the enrichment information as a header may add the enrichment information to all the HTTP requests of the network session being routed towards the server.

The method may include a first component at a security protocol termination for extracting and storing enrichment information and obtaining one or more HTTP requests, and wherein adding the enrichment information as a header may add the enrichment information to only the first HTTP request of the network session and may route the first HTTP request towards the server via a subsequent component, where the method may include: intercepting the first HTTP request and storing the enrichment information from the header of the first HTTP request for the network session; and adding the enrichment information as a header in each subsequent HTTP request for the network session.

The method may include at the subsequent component: receiving the enrichment information in the first HTTP request in an unconverted form; converting the enrichment information to a readable format; replacing the enrichment information in the first HTTP request with the converted enrichment information, and wherein adding the enrichment information as a header in each subsequent HTTP request may add the converted enrichment information.

The method may include at the subsequent component: receiving an HTTP request for a network session; determining if a header exists in the HTTP request for a header type for the enrichment information; and, if the header exists, converting the existing enrichment information in the header to a readable format; and, if the header does not exist, adding the enrichment information in a readable format as a header of the header type.

The method may include: instructing a gateway support node to configure a client handshake initiator packet for negotiating a security protocol with the server for a network session to include enrichment information in a configured extension.

In one embodiment, the network session may be a request from an end user client to a tracking service web application, wherein the request may include a unique token identifying the end user client; and wherein the request may enable the unique token to be mapped to the enrichment information of the network session at the tracking service web application. The network session may be a request from an end user client to a tracking service web application invoked by a code component provided to the end user client by a web server.

The method may further include a method at a tracking service including: receiving an HTTP request with enrichment information and including a unique token as an invocation parameter; and mapping the enrichment information to the unique token for tracking the enrichment information.

The method may further include a method at a client including: sending an HTTPS packet stream including a unique token as an invocation parameter for identifying the client and for mapping to enrichment information added to the HTTPS packet stream from the client.

According to another aspect of the present invention there is provided a system for providing enrichment information using Hypertext Transfer Protocol Secure (HTTPS), the system comprising an enrichment component at a termination of a security protocol in a network, including: a first enrichment information receiving component for extracting and storing enrichment information received in a client handshake initiator packet for negotiating an encryption protocol for a network session of a Hypertext Transfer Protocol Secure (HTTPS) packet stream; and, a first header adding component for obtaining one or more Hypertext Transfer Protocol (HTTP) requests by decrypting the Hypertext Transfer Protocol Secure (HTTPS) packet stream of the network session, and adding the enrichment information as a header to at least the first HTTP request being routed towards a server.

The enrichment component may include a converter component for converting the enrichment information to a readable format before adding the enrichment information as a header to at least the first HTTP request being routed towards the server.

The enrichment component may include a session table for temporarily storing enrichment information together with correlation information for the enrichment information for a duration configured to include a duration of the network session.

The first header adding component may add the enrichment information as a header to only the first HTTP request and the system may further comprise a subsequent component including: a second enrichment information receiving component for intercepting the first HTTP request and storing the enrichment information from the header of the first HTTP request for the network session; and a second header adding component for adding the enrichment information as a header in each subsequent HTTP request for the network session.

The system may include a routing component for routing the first HTTP request of a network session from the enrichment component to the subsequent component.

The system may include at the subsequent component: a converter component for converting the enrichment information to a readable format; a header replacement component for replacing the enrichment information in the first HTTP request with the converted enrichment information; and wherein the second header adding component may add the converted enrichment information.

The system may include a gateway support node including an enrichment information component for adding enrichment information to an unencrypted part of a client handshake initiator packet for a network session in a configured extension.

The enrichment component may be provided in a network device in a network infrastructure. In one embodiment, the enrichment component may be provided in an application firewall network device. The subsequent component may also be provided in a network device in a network infrastructure. In one embodiment, the subsequent component may be provided in a load balancer. The enrichment component may alternatively be provided as part of a server infrastructure.

The system may include a tracking service component including: a request receiving component for receiving an HTTP request with enrichment information and including a unique token as an invocation parameter; and a mapping component for mapping the enrichment information to the unique token for tracking the enrichment information.

The system may include a client component including: a request sending component for sending an HTTPS packet stream including a unique token as an invocation parameter for identifying the client and mapping to enrichment information added to the HTTPS packet stream from the client.

According to a further aspect of the present invention there is provided a computer program product for providing enrichment information using Hypertext Transfer Protocol Secure (HTTPS), the computer program product comprising a computer readable storage medium having program instructions embodied therewith, the program instructions executable by a processor to cause the processor to: extract and store enrichment information received in a client handshake initiator packet for negotiating an encryption protocol for a network session of a Hypertext Transfer Protocol Secure (HTTPS) packet stream at a termination of a security protocol in a network; and, obtain one or more Hypertext Transfer Protocol (HTTP) requests by decrypting the Hypertext Transfer Protocol Secure (HTTPS) packet stream of the network session, and add the enrichment information as a header to at least the first HTTP request being routed towards a server.

Further features provide for the computer readable storage medium to be a non-transitory computer readable medium and for the program instructions to be executable by a processing circuit.

According to another aspect of the present invention there is provided a computer-implemented method for providing enrichment information using Hypertext Transfer Protocol Secure (HTTPS), the method carried out at a gateway support node and comprising: intercepting a client handshake initiator packet for negotiating a security protocol with a server for a HTTPS network session; obtaining enrichment information; configuring the intercepted client handshake initiator packet to add the enrichment information in a configured extension; and, forwarding the enriched client handshake initiator packet.

The enrichment information may be added in an unencrypted part of the client handshake initiator packet. Intercepting the initiator packet may be carried out between a client and a security protocol component where the encryption is terminated and wherein the initiator packet may be unencrypted or partially encrypted and sent from a client when starting a session before encryption keys have been agreed.

The gateway support node may be a mobile network gateway support node and the enrichment information is one of the group of: a Mobile Station International Subscriber Directory Number (MSISDN), a User Equipment Internet Protocol Address (UE IP Address), an International Mobile Subscriber Identity (IMSI), an International Mobile Equipment Identity (IMEI), a User Location, an Internet Protocol (IP) Address, a timestamp, a Remote Access Terminal (RAT), an Access Point Name Network Identifier (APN-NI).

The gateway support node may be in a non-mobile network environment and the enrichment information is one of the group of: an IP Address, User Location, classification of end user, or device capabilities.

The initiator packet may be a Client Hello packet of a Transport Layer Security (TLS) handshake and the configured extension is in the unassigned range of TLS extension options.

According to another aspect of the present invention there is provided a system for providing enrichment information using Hypertext Transfer Protocol Secure (HTTPS), the system comprising a gateway support node including: an intercepting component for intercepting a client handshake initiator packet for negotiating a security protocol with a server for a HTTPS network session; an information obtaining component for obtaining enrichment information; a packet enriching component for configuring the intercepted client handshake initiator packet to add the enrichment information in a configured extension; and, a packet forwarding component for forwarding the enriched client handshake initiator packet.

According to a further aspect of the present invention there is provided a computer program product for providing enrichment information using Hypertext Transfer Protocol Secure (HTTPS), the computer program product comprising a computer readable storage medium having program instructions embodied therewith, the program instructions executable by a processor to cause the processor to: intercept a client handshake initiator packet for negotiating a security protocol with a server for a HTTPS network session; obtain enrichment information; configure the intercepted client handshake initiator packet to add the enrichment information in a configured extension; and, forward the enriched client handshake initiator packet.

According to another aspect of the present invention there is provided a computer-implemented method for providing enrichment information using Hypertext Transfer Protocol Secure (HTTPS), the method comprising: receiving, at a termination of a security protocol in a network, a client handshake initiator packet, the client handshake initiator packet being for negotiating an encryption protocol for a network session of an HTTPS packet stream, and the client handshake initiator packet including enrichment information; extracting the enrichment information from the client handshake initiator packet and storing the extracted enrichment information; obtaining one or more HTTP requests by decrypting the HTTPS packet stream of the network session; and, adding the enrichment information as a header to at least the first HTTP request being routed towards a server.

Embodiments of the invention will now be described, by way of example only, with reference to the accompanying drawings.

DETAILED DESCRIPTION WITH REFERENCE TO THE DRAWINGS

Figure 1:
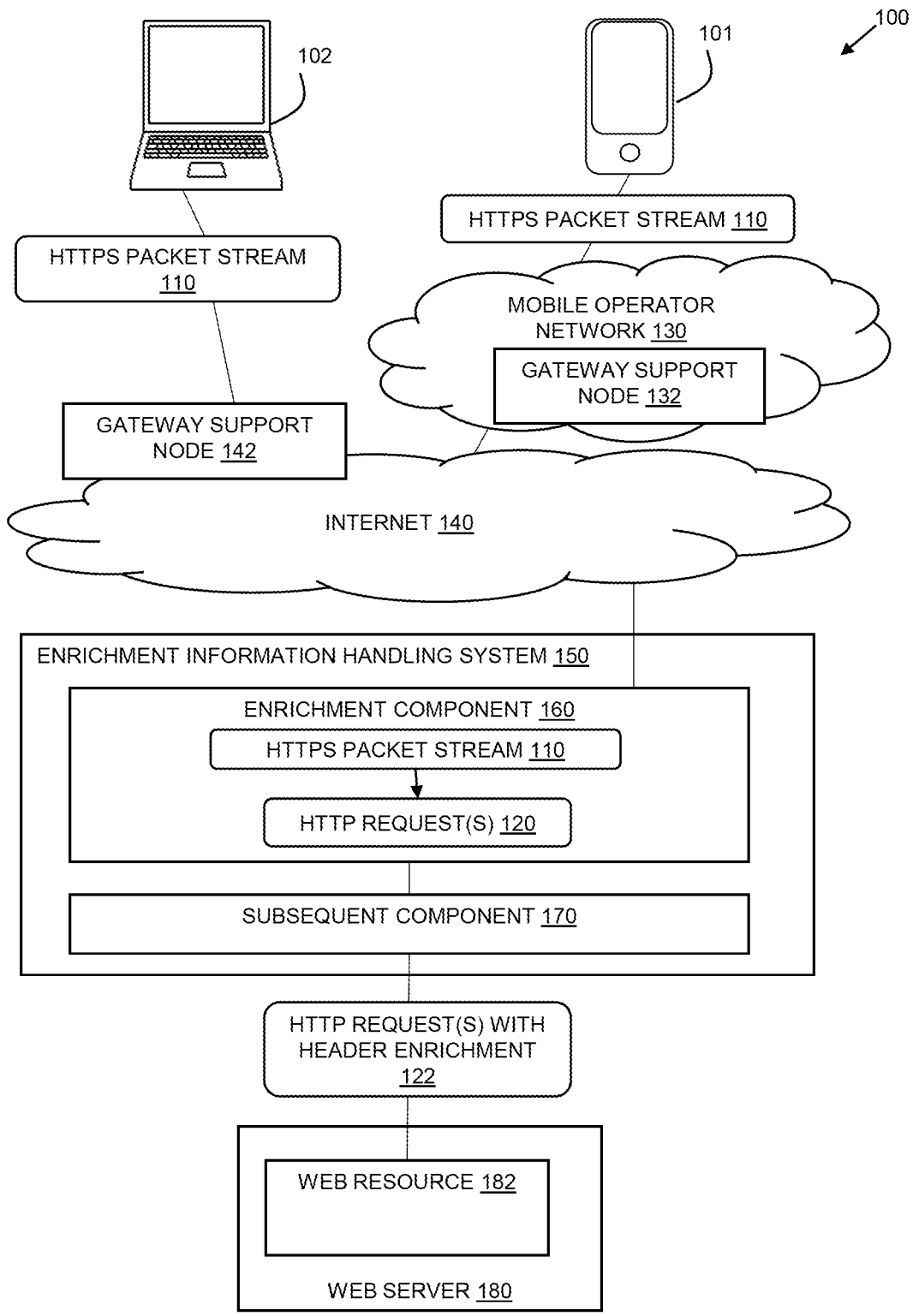
FIG. 1 is a schematic diagram of a network system in which aspects of the present disclosure may be incorporated.

Hypertext Transfer Protocol Secure (HTTPS), which is an extension of the Hypertext Transfer Protocol (HTTP), is used for secure communication over a computer network, such as the Internet. In HTTPS, the communication protocol is encrypted using Transport Layer Security (TLS) or, formerly, Secure Sockets Layer (SSL). The protocol is therefore also referred to as HTTP over TLS, or HTTP over SSL. The term TLS will be used herein and is intended to cover SSL. The security protocol termination (such as TLS or SSL security protocols) is carried out in a network level that is lower than a subsequent processing that interacts with software applications.

The described solution is implemented with at least some of the functionality provided where a security protocol is terminated and the functionality may be provided in software and/or hardware. In one embodiment, the functionality is provided as a single stage as an enrichment component, particularly if the implementation is a software-only solution. The enrichment component can reside inside a network infrastructure as a standalone software component or as part of an existing network component. The enrichment component is provided where a security protocol (for example, TLS) is terminated and where the certificates of the encryption are held. In other embodiments, the functionality may be provided with two or more stages depending on the network architecture and restrictions of network devices in the architecture (for example, web application firewall restrictions). For example, an example embodiment is described herein with a first stage of the method being carried out at an enrichment component where a security protocol is terminated and a second stage of processing being carried out at a subsequent component that interacts with a server resource to which HTTP requests are addressed. The enrichment component and any subsequent component may be provided as part of a network infrastructure or at a server infrastructure.

At the beginning of a network session in order to encrypt the conversation, the server and the client have to agree on a single session key that they will both use to encrypt their packets from that point forward. This exchange is known as a TLS handshake and is carried out between a client and a security protocol component where the encryption is terminated. Following the handshake, HTTPS packets are encrypted when sent by the client and HTTPS packets are decrypted at the security protocol component and forwarded on as HTTP requests to the web server. The security protocol component may be provided at a network device (for example, an application firewall device) and the decrypted HTTP requests may be forwarded to any subsequent network devices, such as a load balancer, before reaching the server. Alternatively, the security protocol component may be provided at the server itself.

The described method and system provide enrichment information using an HTTPS packet stream by providing enrichment information for a session in a first handshake initiator packet from a gateway support node. The gateway support node may be a component close to the client side of the connection, which is responsible for adding a TLS extension with the enrichment value to the first handshake initiator packet. An enrichment component is provided at which the enrichment information is received, temporarily stored and passed on in at least a first HTTP request towards the server. The enrichment information may be passed on in all the HTTP requests from the enrichment component. Alternatively, the enrichment information may be passed on in a first HTTP request to a subsequent component where the enrichment information is retrieved and added as header enrichment in all the subsequent HTTP requests of the session.

Referring to FIG. 1, a block diagram shows an example path that HTTP requests take through a network system (100) that illustrates the concept of the described method and system.

A client device (101, 102) may send HTTPS packet streams (110) addressed to a web resource (182), such as a web page or web service, provided at a remote web server (180). In one example, the client device (101) is a mobile device that connects to the internet (140) via a mobile operator network (130). A gateway support node (132) provided by the mobile operator network (130), such as a Gateway GPRS (General Packet Radio Services) Support Node (GGSN), keeps the mobile client device (101) connected to the internet (140) and web resources (182). In another example, the client device (102) is a computing device that connects to the internet (140) directly or via intermediate networks, and there may be a gateway support node (142), such as a network edge device, provided by an Internet Service Provider (ISP). It should be appreciated that even though only one mobile client device (101) and one client computing device (102) are shown, in a practical implementation there may be a plurality of each of the client devices (101, 102).

The described method and system provide an enrichment information handling system (150) for handling enrichment information received in a client handshake initiator packet for a network session and providing the enrichment information in subsequent HTTP requests in the session. The enrichment information handling system (150) may be provided, at least in part, where the termination of the security encryption is performed on network traffic going to a web resource (182) at a web server (180). In one embodiment, the enrichment information handling system (150) may be provided at a network infrastructure, for example, at one or more network devices such as an application firewall and a load balancer that may be used for many web servers (180) simultaneously. In another embodiment, the enrichment information handling system (150) may be provided at a server infrastructure.

The enrichment information handling system (150) includes an enrichment component (160) provided at a point at which cryptographic protocols with clients are terminated providing secure communication of data sent to or from a client across the network. The enrichment information handling system (150) may optionally also include a subsequent component (170) that handles the decrypted network traffic before arriving at the web resource (182) or at the web server (180).

The enrichment component (160) handles the encryption termination of HTTPS packet streams from a client and, therefore, carries out the security handshake with the client device (101, 102), holds the relevant certificates, and decrypts the requests. All the HTTPS packets get decrypted in the enrichment component (160) and unencrypted HTTP requests continue the journey to the web server (180). The enrichment component (160) provides the described functionality of enriching and forwarding decrypted HTTP requests towards the web server (180).

In the described method, as a first stage, a gateway support node (132, 142), as a service between the client (101, 102) and the enrichment component (160), intercepts a handshake initiator packet from the client (101, 102) for a session and adds enrichment information into a TLS extension. In a mobile network, the gateway support node (132) may be a GGSN and in a non-mobile network, the gateway support node (142) may be a network boundary at which enrichment may be carried out, such as network gateways or edge products that support enrichment functionality. In the described method, the gateway support node (132, 142) is configured to add a specified type of enrichment information to a TLS extension.

The enrichment component (160), at the point of handshake negotiation with the client (101, 102), temporarily stores the enrichment information for the session that has been added to the handshake initiator packet by the gateway support node (132, 142).

When an HTTPS packet stream (110) of a session is sent from the client device (101, 102) addressed to a web resource (182) at a web server (180), the enrichment component (160) of the enrichment information handling system (150) decrypts the HTTPS packet stream (110) to obtain one or more HTTP requests (120) that are forwarded to the web server (180), optionally via a subsequent component (170).

At the enrichment component (160), the enrichment information is added as a header to at least the first HTTP request (120).

In one embodiment, a header is converted to a readable format and added at the enrichment component (160) to all the decrypted HTTP requests (120) and, therefore, processing at a subsequent component (170) is not required.

In another embodiment, only the first HTTP request (120) has a new header added at the enrichment component (160) when routing of requests is decided and the enrichment information is carried by the first HTTP request (120) to a subsequent component (170), where it is converted to a readable format and stored ready for insertion as a header in all subsequent HTTP requests in the session to result in HTTP requests with header enrichment that are received at the web resource (182) of the web server (180).

Figure 2A:
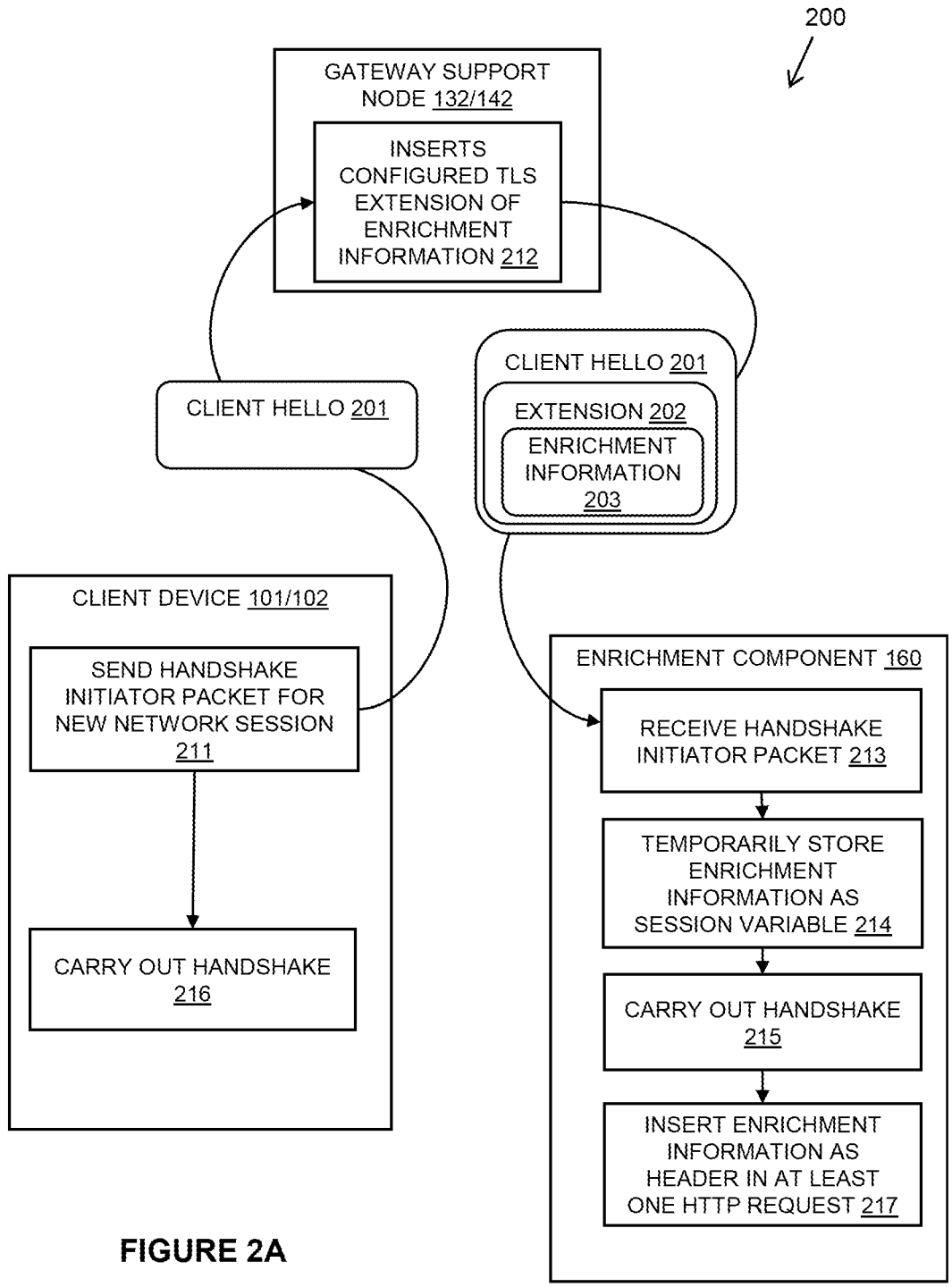
FIG. 2A is a schematic diagram of an example embodiment of a flow between a client device and an enrichment component during a security handshake in accordance with an aspect of the described method.

Referring to FIG. 2A, a schematic flow diagram (200) shows an example embodiment of the aspect of the method carried out during the security handshake between the client device (101, 102) and the enrichment component (160), which provides a security protocol component as well as the enrichment functionality. The security handshake is intercepted by a gateway support node (132, 142) such as a mobile network gateway support node (132) (for example, a GGSN) or a non-mobile gateway support node (142), such as an ISP node.

A typical security handshake protocol, such as a TLS handshake, includes the following message exchange. Variations including additional messages may be included.

Client Hello (unencrypted or partially encrypted), from client device (101, 102) to enrichment component (160);

Server Hello (unencrypted or partially encrypted), Server Certificate, Server Key, Server Hello Done, from the enrichment component (160) to client device (101, 102);

Client Key Exchange, Client Change Cipher Spec Exchange, Client Handshake Finished, from client device (101, 102) to enrichment component (160); and Server Cipher Spec Exchange, Server Handshake Finished, from enrichment component (160) to client device (101, 102).

The TLS protocol also provides its own message framing mechanism and signs each message with a message authentication code (MAC). The MAC algorithm is a one-way cryptographic hash function (effectively a checksum), the keys to which are negotiated by both connection peers. Whenever a TLS record is sent, a MAC value is generated and appended for that message, and the receiver is then able to compute and verify the sent MAC value to ensure message integrity and authenticity.

An initiator packet of the security handshake is a Client Hello (201), referred to herein as a client handshake initiator packet, that is sent (211) from the client device (101, 102) when starting a session. This is a packet sent before the encryption keys have been agreed. For example, the TLS 1.2 handshake protocol may be used in which the packet is unencrypted, or the TLS 1.3 handshake protocol may be used in which the packet is partially encrypted.

In the described method, the gateway support node (132, 142) inserts (212) an agreed and configured TLS extension with enrichment information. The gateway support node (132, 142) obtains the enrichment information of the client (101) and adds this as enrichment information to the TLS extension. In the case of a TLS 1.3 handshake, the enrichment information is inserted in an unencrypted part of the client handshake initiator packet.

The Client Hello (201), including the extension (202) of the enrichment information (203), is received (213) at the enrichment component (160). The enrichment information is read and temporarily stored (214) as a session variable at a session table in in-memory storage at the enrichment component (160). The enrichment information is referenced by a session identifier used as a key value, such as a combination of the source Internet Protocol (IP) and source port.

The enrichment component (160) removes the newly added extension (202) from the payload and then carries out the security handshake (215) by exchanging the security details with the client device (101, 102) that carries out its side of the remaining handshake (216). The enrichment component (160) inserts (217) a header into one or more of the decrypted HTTP requests from the client device (101, 102) belonging to the session with the value of the enrichment information fetched from the temporary storage using the session identifier.

In a specific embodiment, the steps carried out by the handshake protocol may include the following:

1. The client (e.g. mobile device) sends a "Client hello" message to the enrichment component, along with the client's random value and supported cipher suites.
2. The gateway support node intercepts the message and adds enrichment information to a predefined extension field in a hexadecimal format.
3. The enrichment component receives the "Client hello" message and extracts the enrichment information from the extension field. It also removes the extension from the "Client Hello" message and adjusts the field lengths of the message accordingly.
4. The enrichment component stores this information to a session table in the form of key-value pairs:
   <<Source IP/Port>>:<<Enrichment Information>>
   e.g. Key: "91.241.94.10, 47151", Value: "73616d706c656d73696464e0d0a"
5. The enrichment component responds by sending a "Server hello" message to the client, along with the enrichment component's random value.
6. The enrichment component sends its certificate to the client for authentication and may request a certificate from the client. The enrichment component sends the "Server hello done" message.
7. If the enrichment component has requested a certificate from the client, the client sends it.
8. The client creates a random pre-master secret and encrypts it with the public key from the enrichment component's certificate, sending the encrypted pre-master secret to the enrichment component.
9. The enrichment component receives the pre-master secret. Both the enrichment component and the client each generate the master secret and session keys based on the pre-master secret.
10. The client sends a "Change cipher spec" notification to the enrichment component to indicate that the client will start using the new session keys for hashing and encrypting messages. The client also sends a "Client finished" message.
11. The enrichment component receives the "Change cipher spec" notification and switches its record layer security state to symmetric encryption using the session keys. The enrichment component sends a "Server finished" message to the client.
12. The client and the enrichment component can now exchange application data over the secured channel they have established. All messages sent from the client to the enrichment component and from the enrichment component to the client are encrypted using session key.

13. The client sends encrypted data towards the web server (e.g. requesting a web resource).
14. The enrichment component intercepts and decrypts the data and adds enrichment information to them, before routing them to the web server.

Note that Steps 5 to 12 describe in detail how the TLS 1.2 handshake process works and are not specific to the enrichment implementation. They are only meant as reference as to the actions the enrichment component executes in order to facilitate the header enrichment over HTTPS.

Figure 2B:
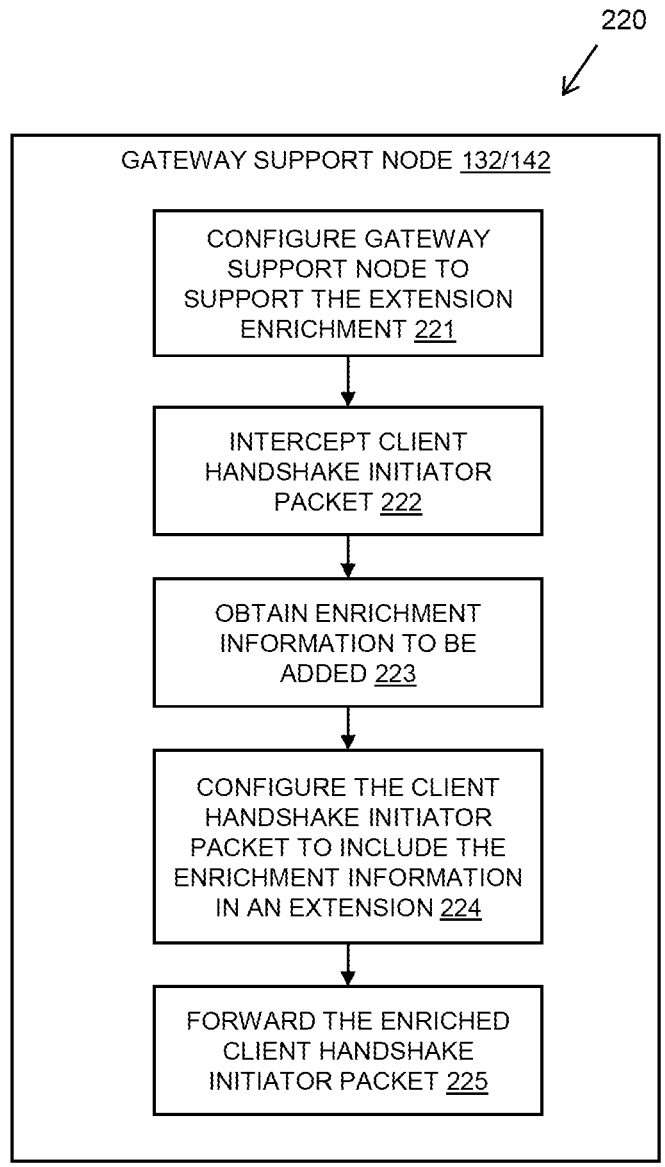
FIG. 2B is a flow diagram of an example embodiment of a flow in a gateway support node in accordance with another aspect of the described method.

Referring to FIG. 2B, a flow diagram (220) shows an embodiment of the described method carried out at a gateway support node (132/142). The gateway support node may be a mobile network gateway support node (132) (for example, a GGSN) or a non-mobile gateway support node (142), such as an ISP node.

The gateway support node (132, 142) is configured (221) in the described method to support the described extension enrichment and includes a relevant configuration to enable the provision of the enrichment information.

The gateway support node (132, 142) may intercept (222) a client handshake initiator packet for negotiating a security protocol with the server for a HTTPS network session. The initiator packet is intercepted between a client and a security protocol component where the encryption is terminated. The initiator packet is unencrypted or partially encrypted and sent from a client when starting a session before encryption keys have been agreed.

The gateway support node (132, 142) may obtain (223) enrichment information that is to be added. This may be obtained from the client, a record associated with the client, or may relate to non-client specific information such as a timestamp. The gateway support node (132, 142) may configure (224) the intercepted client handshake initiator packet to add the enrichment information in a configured extension. The initiator packet may be unencrypted or partially encrypted and the enrichment information may be added in an unencrypted part of the packet. The gateway support node (132, 142) may forward (225) the enriched intercepted client handshake initiator packet to its destination of a security protocol component where the encryption is terminated.

The enrichment information may be any type of information and not necessarily sensitive information. In a mobile network embodiment, depending on the network operator's support node capabilities, the following examples of enrichment information may be provided using the described method: MSISDN, User Equipment Internet Protocol Address (UE IP Address), International Mobile Subscriber Identity (IMSI), International Mobile Equipment Identity (IMEI), User Location, IP Address, Timestamp, Remote Access Terminal (RAT) (for example, UTRAN, GERAN, WLAN, GAN, HSPA_Evolution, EUTRAN, Virtual, EUTRAN-NB-IoT), Access Point Name Network Identifier (APN-NI). In a non-mobile network embodiment, the gateway support node may provide enrichment information in the form of any type of information, and examples may include: an IP Address, User Location, classification of end user, or device capabilities.

TLS extensions are by default part of the first handshake packet. For example, Server Name Indication (SNI) is an extension to the Transport Layer Security (TLS) computer networking protocol by which a client indicates which hostname it is attempting to connect to at the start of the handshaking process. The client states which extensions it supports during the handshake in the Client Hello message and the server chooses which extensions to use at its discretion. In order for the handshake to be successful, the enrichment TLS extension that has been added by the gateway support node is removed.

The described method is based on the fact that the first packet of the TLS handshake is unencrypted or partially encrypted. This is the only packet that can be read and manipulated by adding an extra TLS extension. Using the TLS extension, the TLS capabilities may be expanded without actually modifying the protocol itself. The gateway support node (132, 142) is configured in the described method to support TLS extension enrichment and apply the relevant configuration to enable the provision of the enrichment information. The TLS extension that is added may, for example, belong to the range 14907-19017 (unassigned) according to TLS extension options. In an example embodiment, extension number 14910 is used.

Figure 3A:
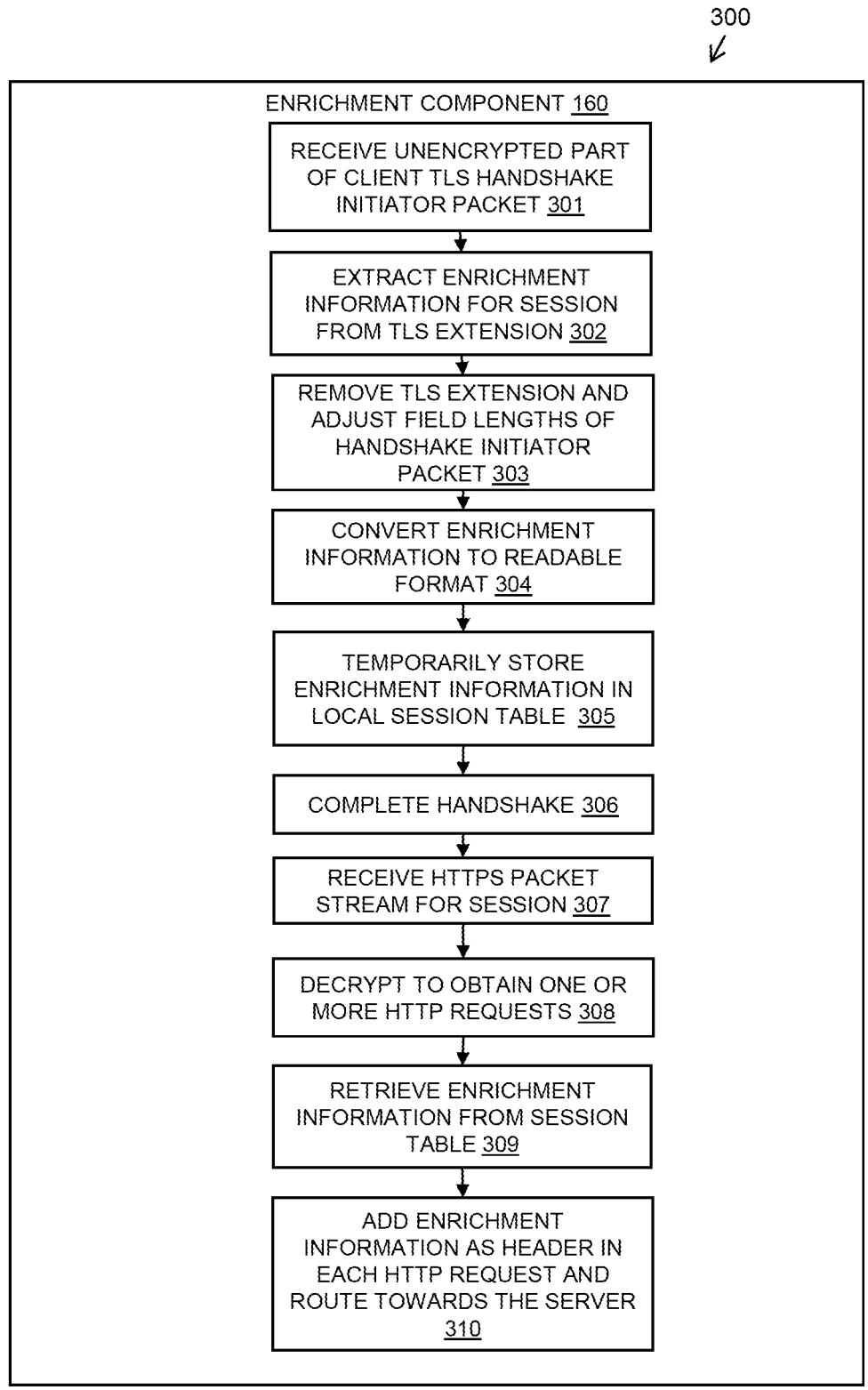
FIG. 3A is a flow diagram of an example embodiment of a flow in an enrichment component in accordance with another aspect of the described method.

Referring to FIG. 3A, a flow diagram (300) shows an embodiment of the described method carried out at an enrichment component (160), which is a single component provided by software and/or hardware. In one embodiment, the enrichment component (160) may reside in a network infrastructure as a standalone software component or as part of an existing network component. It is responsible for terminating the security protocol and holds the certificates for the encryption as well as being responsible for forwarding HTTP requests towards a web server.

The enrichment component (160) receives (301) a client handshake initiator packet and may extract (302) enrichment information for the session by reading the extension field included in the initiator packet, such as a TLS extension of a Client Hello message in a TLS handshake.

The enrichment component (160) removes (303) the enriched TLS extension from the client handshake initiator packet prior to the handshake process and updates the field lengths of the handshake initiator packet.

The enrichment component may convert (304) the enrichment information from a received hexadecimal format to a readable format such as a string before or after temporarily storing (305) the enrichment information in a local session table. The session table also holds correlation information for the enrichment information by storing session specific information to identify the owner of the HTTP requests. The session table may hold key-value pairs, where the key is a unique session identifier, such as a combination of the source IP and source port, and the value is the enrichment information either in hexadecimal format or in a converted readable format. The handshake protocol is then completed (306) with the client device.

The enrichment component (160) receives (307) all the HTTPS packet streams of the session and decrypts (308) the packets to extract one or more HTTP requests all belonging to the same HTTPS packet stream. While packets are exchanged between client and server, the HTTPS session remains open. Once one of the two peers sends a shutdown message, the HTTPS session is terminated. The enrichment information that is stored in the local session table for the session is retrieved (309) and, optionally converted to readable format if it was not converted before being stored, and added (310) as a header in each HTTP request that is routed towards the server. In this way, each HTTP request will include a readable format of the enrichment information in a header that is received at a web server.

Figure 3B:
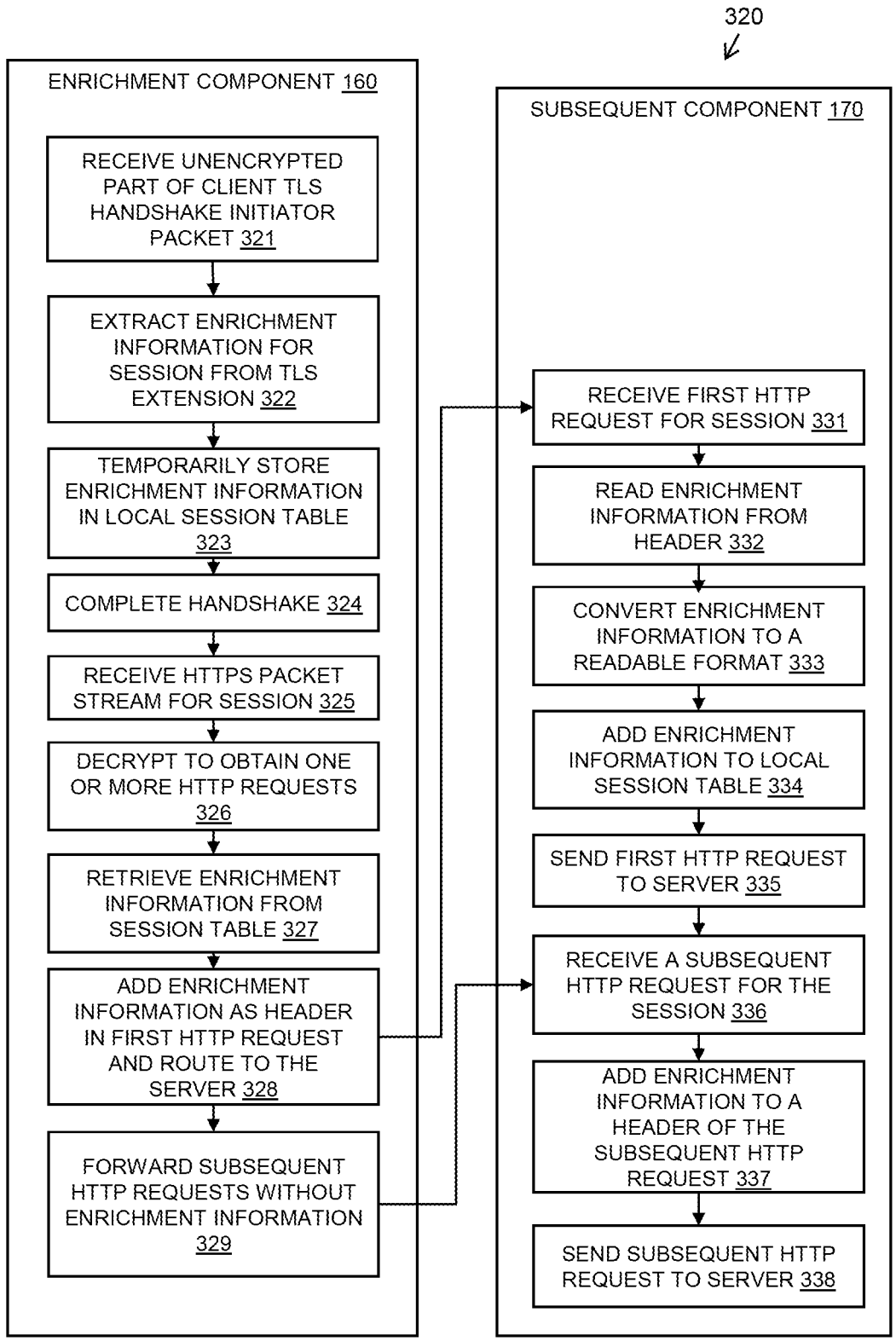
FIG. 3B is a swim-lane diagram of an example embodiment of a flow in and between an enrichment component and a subsequent component in accordance with another aspect of the described method.

Referring to FIG. 3B, a flow diagram (320) shows an embodiment of the described method carried out at an enrichment component (160) and a subsequent component (170) of the described enrichment information handling system (150). The enrichment component (160) and the subsequent component (170) may be provided at the same computing device or may be separated. These components (160, 170) may be provided at any suitable point in a client handshake initiator packet's path. A routing component may optionally be provided either as part of one of the components (160, 170), or as a separate component between the two. In one embodiment, the enrichment component (160) may be provided at an application firewall network device and the subsequent component (170) may be provided at a load balancer.

The enrichment component (160) receives (321) a client handshake initiator packet, being an unencrypted part of a client TLS handshake initiator packet, and may extract (322) enrichment information for the session. The enrichment information may be included in an extension to the initiator packet, such as a TLS extension of a Client Hello message in a TLS handshake. The extension may be removed and the field lengths of the handshake initiator packet may be adjusted.

The enrichment component (160) temporarily stores (323) the enrichment information in a local session table with a value key of a session identifier, such as a combination of the source IP and source port. The handshake protocol is then completed (324) with the client device.

The enrichment component (160) receives (325) the HTTPS packet stream of the session and decrypts (326) the packets to obtain one or more HTTP requests all belonging to the same HTTPS packet stream. While packets are exchanged between client and server, the HTTPS session remains open. Once one of the two peers sends a shutdown message, the HTTPS session is terminated. The enrichment information that is stored in the local session table for the session is retrieved (327) and added (328) as a header in the first HTTP request that is routed towards the server. In this embodiment, any subsequent HTTP requests are forwarded (329) without enrichment information to accommodate network devices that do not allow headers to be added to subsequent HTTP requests in a session from the enrichment component (160).

The subsequent component (170), downstream of the enrichment component (160), receives (331) the first HTTP request for a session and reads (332) the enrichment information from the header of the first HTTP request. The enrichment information is converted (333) from a hexadecimal format received from the enrichment component (160) to a readable format such as a string. The enrichment information is added (334) to a local session table referenced by a session identifier.

The first HTTP request has the enrichment information in its header converted and is sent (335) to the server. Subsequent HTTP requests are received (336) at the subsequent component (170) and the converted enrichment information is retrieved from the session table and added (337) as a header in the subsequent HTTP requests, which are sent (338) to the server.

Figure 4A:
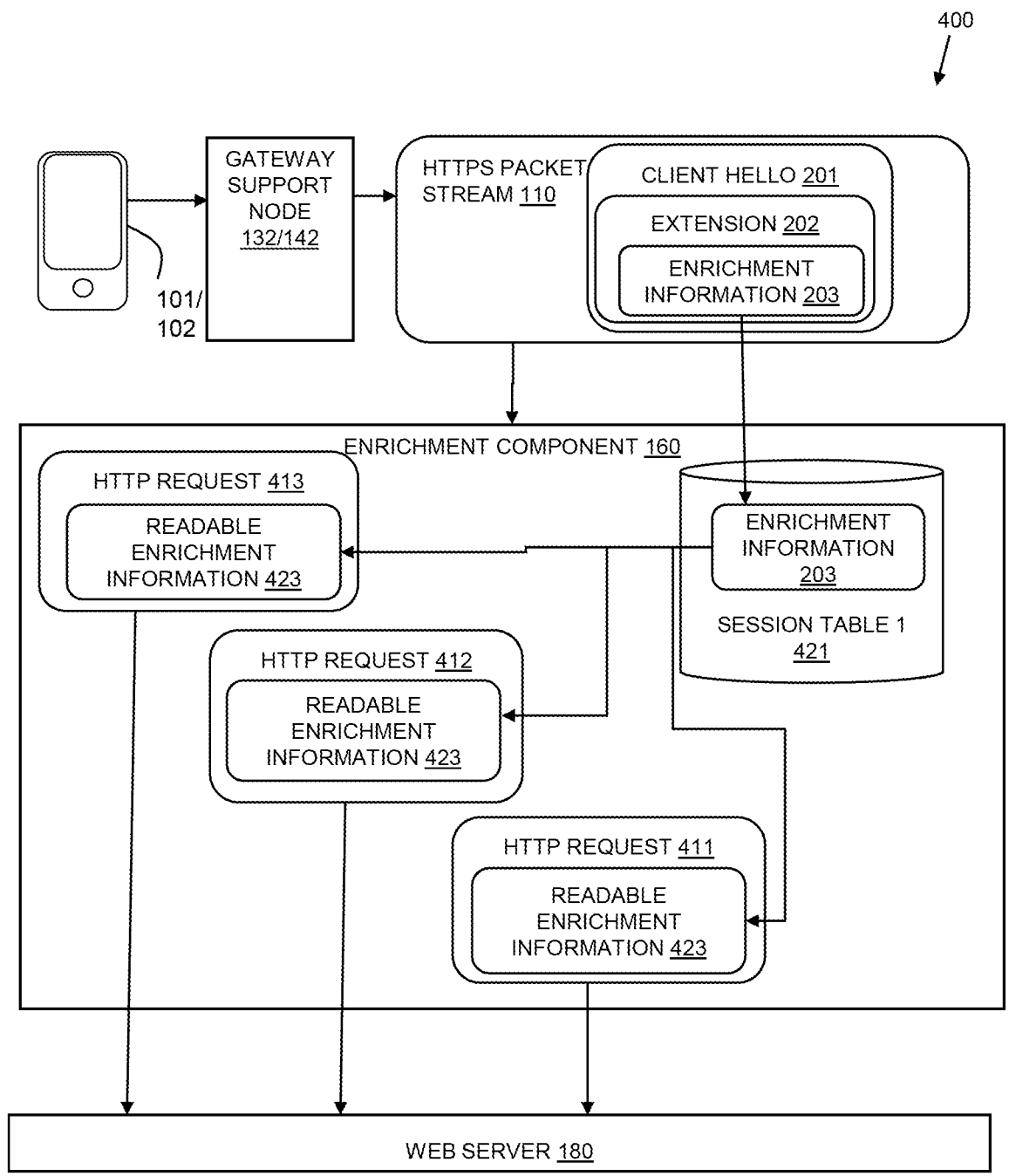
FIG. 4A is a schematic diagram illustrating the flow of the example embodiment of FIG. 3A.
Figure 4B:
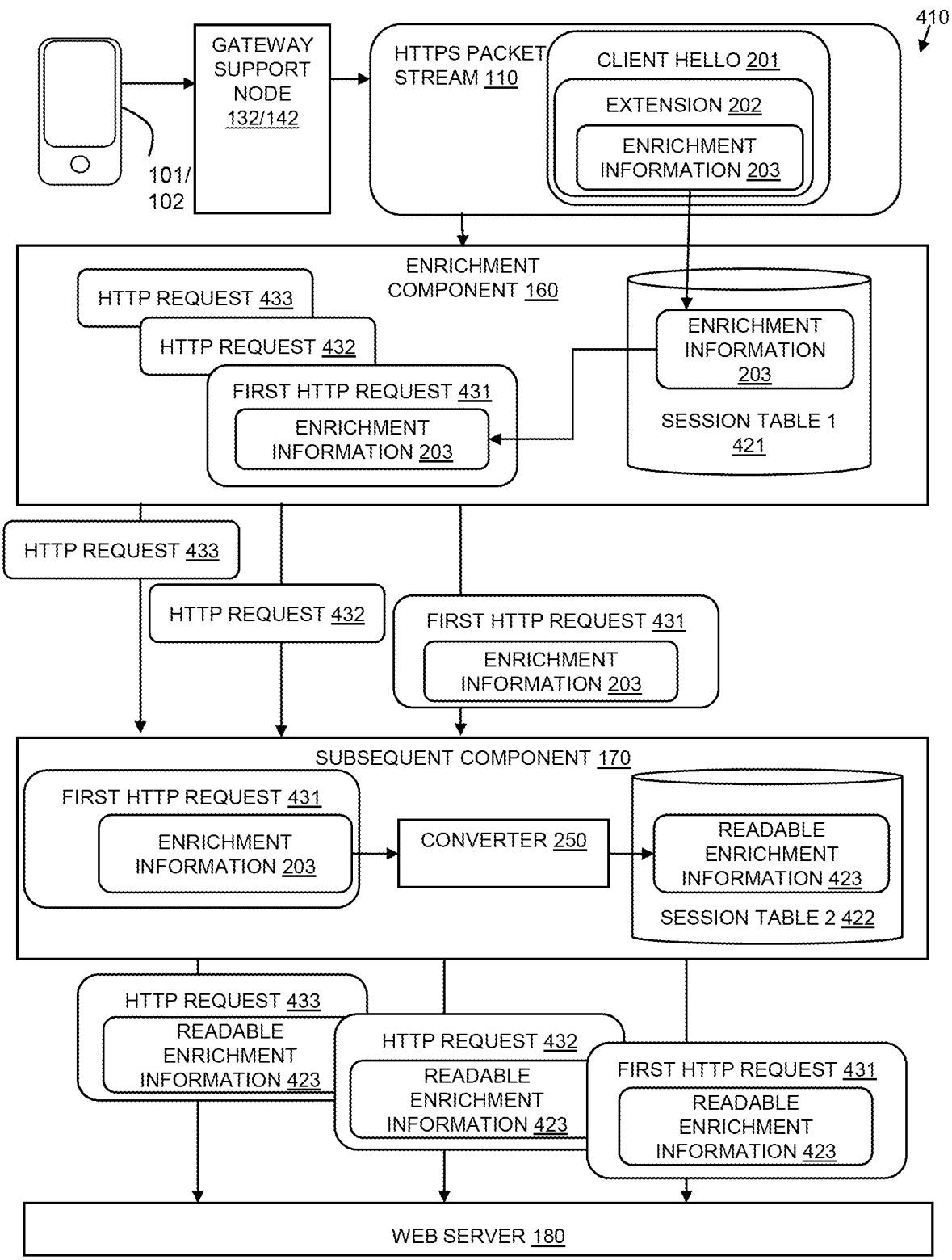
FIG. 4B is a schematic diagram illustrating the flow of the example embodiment of FIG. 3B.

Referring to FIGS. 4A and 4B, schematic diagrams (400, 410) illustrate example embodiments of the described method and system. A gateway support node (132, 142) forwards an HTTPS packet stream (110) including a security handshake "Client Hello" message (201) originating from a client device (101, 102), with the gateway support node (132, 142) adding an extension (202) to the handshake message (201) holding enrichment information (203).

An enrichment component (160) receives and stores the enrichment information (203) in a session table 1 (421). The enrichment component (160), after removing the added extension by the gateway support node, decrypts the HTTPS packet stream (110) to obtain HTTP requests.

In the embodiment of FIG. 4A, the enrichment information (203) from session Table 1 (421) is added as headers to each of the HTTP requests (411-413) before they are forwarded towards the web server (180). The enrichment information may be converted to a readable format either before storing in the session Table 1 (421) or after being retrieved from the session Table 1 (421) such that the HTTP requests (411-413) include readable enrichment information (423).

In the embodiment of FIG. 4B, the enrichment component (160) decrypts the HTTPS packet stream (110) to obtain a first HTTP request (431) and subsequent HTTP requests (432, 433). The enrichment information (203) from session Table 1 (421) is added as a header to the first HTTP request (431) being routed towards the web server (180).

In the embodiment of FIG. 4B, the first HTTP request (431) with the enrichment information header (203) and the subsequent HTTP requests (432, 433) are sent to a subsequent component (170) that extracts the enrichment information (203) from the header of the first HTTP request (431), applies a conversion by a converter (250) to a readable form, and stores the readable enrichment information (423) in session Table 2 (422) at the subsequent component (170). The readable enrichment information (423) is added as a header to the first HTTP request (431) and to subsequent HTTP requests (432, 433) that are forwarded by the subsequent component (170) to the web server (180).

In both the embodiments illustrated by FIGS. 4A and 4B, the enrichment component (160) is responsible for the encryption termination as it is the component or device that holds the relevant certificates and decrypts the HTTPS packet stream. Prior to the handshake, the enrichment component (160) reads the handshake initiator packet, scanning through all the available TLS extensions (located in the Client Hello message) and fetching the value of the newly added TLS extension number (as an example, extension number 14910) and removes it from the Client Hello payload. The enrichment component (160) stores the value in hexadecimal format (as it arrives) in a session table. A session table is an in-memory table which has been configured to store the value for a configured period to allow for the TLS session to complete (for example, 3 seconds).

The session at a network level may be identified by the source IP and source port. This combination is unique for all HTTPS packets received as part of the same HTTPS session, may be used as the key value of the session table. The session table is used so that the TLS extension value (the enrichment information) that has been fetched at the beginning of the session (in the first Client Hello packet), will be available until the session ends (i.e. the connection closes). An HTTPS connection is open until one of the two peers sends a shutdown message and usually this event depends on the application.

In the embodiment of FIG. 4B, the value in the form of the enrichment information is available in the session table to be added at the first decrypted HTTP request in the session. For the purposes of this example, the enrichment information may be the MSISDN of a subscriber client. The enrichment information is added as a new header.

The subsequent component (170) also creates a session table in its own memory (e.g. if it is a different independent device to the enrichment component (160)), and stores the value of the header containing the enrichment information as a variable in this table. Once again, the key of this session table will be the source IP and source port combination.

All the requests passing through the subsequent component (170) are unencrypted as the decryption was carried out by the enrichment component (160). At the subsequent component (170), the session table is needed in order to add the enrichment information from the first HTTP request header into all the subsequent HTTP requests of the session as headers. Furthermore, the subsequent component (170) may transform the header enrichment information from a hexadecimal value to a string format.

If a header exists in the request (which means that it is the first HTTP request enclosed in the HTTPS packet stream) then the subsequent component (170) simply transforms and overwrites the value of the header. If the header does not exist (which means that it is not the first HTTP request enclosed in the HTTPS packet stream), it fetches the value from the session table and inserts the header into the request.

The headers may have different names to declare in which component (e.g. different network devices) the header was initially added in the HTTP request. The actual header key, added in the solution, will be the same. Note that it is optional to use different header names and, if requested, the same header name can be used and in this case all requests will end up having the same header in the web server (180). The web server (180) may receive the header enrichment information as if it were receiving header enrichment information as known for client originating HTTP requests.

In an example embodiment where the enrichment component (160) is provided at an application firewall network device and the subsequent component (170) is provided at a load balancer, the functionality may be implemented using TCL scripts which can extend the functionality of network devices. Two TCL scripts may be provided to act in the flow.

The first TCL script at the enrichment component (160) is responsible for decrypting, fetching, storing in a session table, removing the extension, adjusting the field lengths and adding the first header (e.g. Y-MSISDN) with the value of the hexadecimal extension value (e.g. the value of the TLS extension 14910) in the first enclosed and decrypted HTTP request.

The second TCL script at the subsequent component (170) is responsible for storing the first header value (e.g. Y-MSISDN) of the first HTTP request of the session to a session table, transform it to a readable format, and replace it with the new format or import it as a new header (e.g. X-MSISDN) in all the subsequent HTTP requests of the session.

The first TCL script implemented with TCL commands that manipulate the TLS process, does the following:
creates a session table in memory, where the extension value will be stored for a custom period of time;
catches and removes extension value;
adjusts the field lengths of the Client Hello message by removing the extension;
saves in a session variable the TLS extension 14910 value in hexadecimal format;
adds the extension value to the session table prior to the HTTP request event;
releases the handshake;
inserts a header (Y-MSISDN) to the first HTTP request of the HTTPS packet;
fetches the TLS extension 14910 value from the session table;
assigns this value to the new header (Y-MSISDN).

The second TCL script, located in the subsequent component, does the following:
creates a session table in memory, where the extension value will be stored for a custom period of time;
saves the value of the Y-MSISDN (which is in hexadecimal format) in the session table;
transforms this value to a bit string format;
replaces the value of the Y-MSISDN header with the new value for the first HTTP request of the session;
for all the subsequent HTTP requests of the session, adds a new header (X-MSISDN) with the value retrieved from the session table.

In this example, two header names of Y-MSISDN and X-MSISDN are used; however, it will be appreciated that the same header name may be used.

In an example embodiment, all the above may be implemented within a software component. The software component is responsible for obtaining the enrichment information and handling the SSL handshake and does the following:
scans the Client Hello payload for the extension value;
saves in memory the extension value and its length;
removes the extension from the payload;
updates the field lengths;
transforms the enrichment value from hexadecimal to a bit string format;
completes the SSL handshake;
adds the enrichment information as a header to the HTTP request.

In another example embodiment, the gateway support node component is a software component that does the following:
intercepts the Client Hello packet;
adds in the Client Hello payload the TLS extension the value;
recalculates the field lengths by adding the length of the new extension; and
forwards the enriched client handshake initiator packet.

Figure 5:
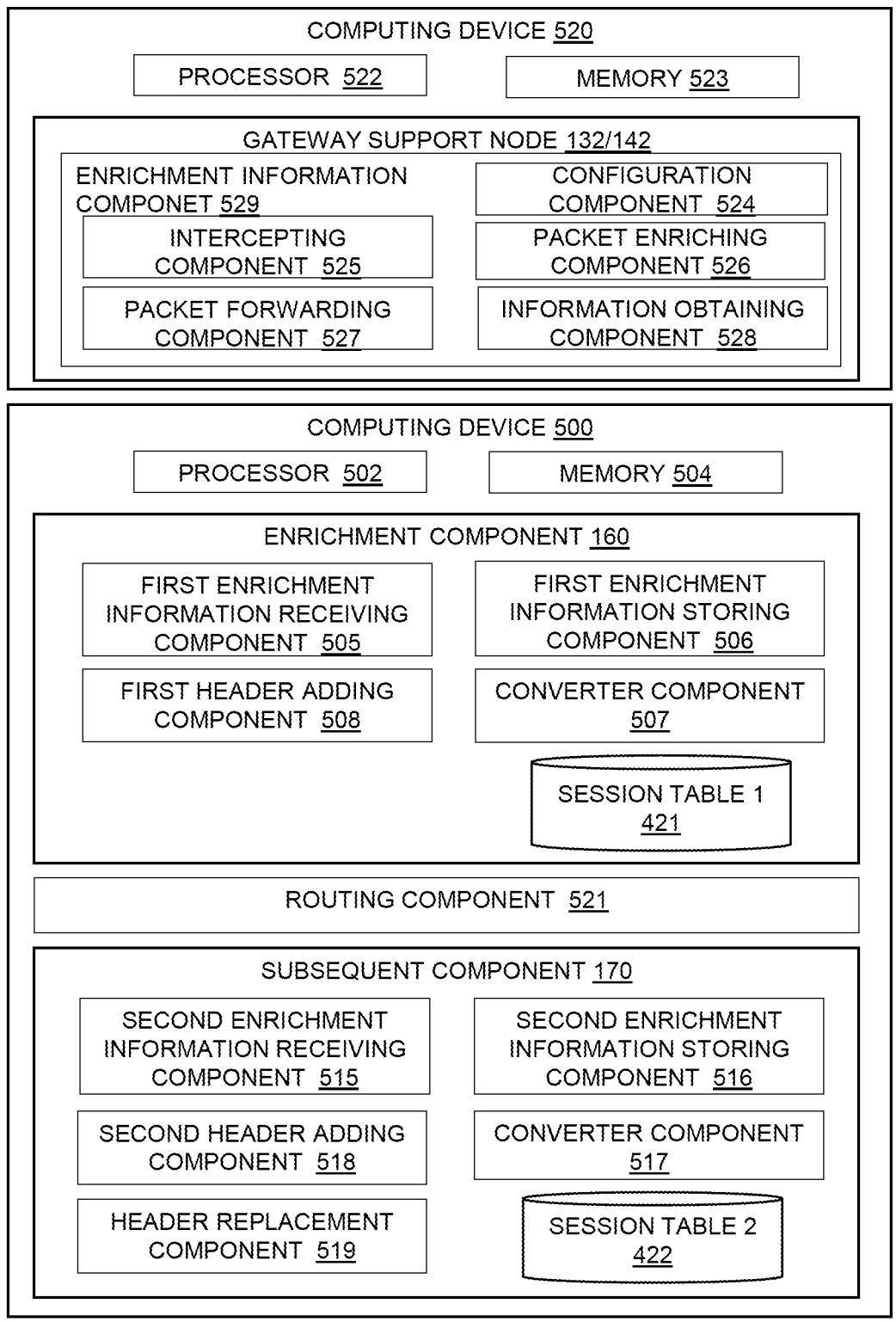
FIG. 5 is a block diagram of an example embodiment of the described system.

Referring to FIG. 5, a block diagram shows an example embodiment of a computing device (520) that may provide a gateway support node (132, 142). The computing device (520) on which the components are implemented may include a processor (522) for executing the functions of components described below, which may be provided by hardware or by software units executing on the computing device (520). The software units may be stored in a memory component (523) and instructions may be provided to the processor (522) to carry out the functionality of the described components.

The gateway support node may include an enrichment information component (529). The gateway support node (132, 142) may include a configuration component (524) for receiving configuration instructions to apply the relevant configuration to client handshake initiator packets passing through the gateway support node (132, 142) to enable the provision of the enrichment information. The gateway support node (132, 142) may include: an intercepting component (525) for intercepting a client handshake initiator packet for negotiating a security protocol with the server for a HTTPS network session; an information obtaining component (528) for obtaining enrichment information; a packet enriching component (526) for configuring the intercepted client handshake initiator packet to add the enrichment information in a configured extension; and a packet forwarding component (527) for forwarding the enriched client handshake initiator packet.

FIG. 5 also shows an example embodiment of a computing device (500) that may provide an enrichment component (160) and an optional subsequent component (170) implementing the functionality of the enrichment information handling system (150).

The enrichment component (160) and the subsequent component (170) of the enrichment information handling system (150) may be provided by the same or separate computing device(s) (500). The enrichment information handling system (150) may be placed in various locations in the network or server infrastructure at the termination of the encryption protocol of an HTTPS packet stream.

The computing device(s) (500) may be network devices in a network infrastructure. In an embodiment, the enrichment component (160) may be provided as part of an application firewall network device and the subsequent component (170) may be provided as part of a load balancer.

The application firewall network device may route HTTP requests to the load balancer for forwarding to a web resource. In another embodiment, the computing device(s) (500) may be part of a server infrastructure with internal routing of the HTTP requests.

The computing device(s) (500) on which the components are implemented may include a processor (502) for executing the functions of components described below, which may be provided by hardware or by software units executing on the computing device (500). The software units may be stored in a memory component (504) and instructions may be provided to the processor (502) to carry out the functionality of the described components. In some cases, for example in a cloud computing implementation, software units arranged to manage and/or process data may be provided remotely.

The enrichment component (160) may include a first enrichment information receiving component (505) for receiving and extracting enrichment information received in a client handshake initiator packet for negotiating an encryption protocol for a network session and a first enrichment information storing component (506) for temporarily storing the enrichment information in a first session table (421) referenced by a session identifier. The enrichment component (160) may, in some embodiments, also include a converter component (507) for converting the enrichment information to a readable format. The enrichment component (160) may include a first header adding component (508) for, after receiving a first HTTPS packet for the session and decrypting the HTTPS packet stream, obtaining one or more HTTP requests, and adding the enrichment information as a header to at least the first HTTP request being routed towards the server.

The subsequent component (170) may include a second enrichment information receiving component (515) for receiving the enrichment information from the header of a first HTTP request for the session routed through the subsequent component (170) and a second enrichment information storing component (516) for storing the enrichment information in a second session table (422) referenced by a session identifier. The subsequent component (170) may also include a converter component (517) for converting the enrichment information to a readable format. The subsequent component (170) may include a header replacement component (519) for replacing the enrichment information in the first HTTP request with the converted enrichment information and a second header adding component (518) for adding the enrichment information as a header in each subsequent HTTP request for the session.

A routing component (521) may be provided for routing HTTP requests from the enrichment component (160) to the subsequent component (170), if these are in different locations. The routing component (521) may be provided as part of the enrichment component (160) or the subsequent component (170).

In an embodiment in which the enrichment component (160) and the subsequent component (170) are provided at the same computing device (500), a shared session table may be used. However, the session identifier keys may be different for the stored session values. For example, a source IP and port may be used as a session identifier key and these may be different at the enrichment component (160) and the subsequent component (170).

In an example embodiment, the enrichment component (160) and the subsequent component (170) may be implemented in two software components (SC1, SC2) that may use a routing component (RC) as part of the infrastructure. RC is an optional component that can also be implemented as software and be part of either SC1 or SC2. All SC1, SC2, and RC may run as standalone software in any physical, virtual, or dockerized solution or as parts of network components (e.g. firewall, load balancer, etc.). Also, these components may be implemented as part of a server infrastructure, rather than a network infrastructure. Since the proposed components manipulate protocols in different OSI levels, they can be implemented with specialized hardware or by using software and as such, they may run on any machine that can execute such a software solution.

SC1 is responsible for the SSL termination and TLS extension value extraction. It holds the relevant certificates and decrypts the requests, which are then forwarded unencrypted to the next component. RC forwards the requests to SC2. SC2 is responsible for enriching the header of all HTTP requests of the session with the extracted value.

In detail, SC1 is responsible for reading the decrypted packet, scanning through all the available TLS extensions (located in the Client Hello message) and fetching the value of the newly added TLS extension number, removing it from the Client Hello payload and adjusting the field lengths of the packet. Then, it stores the value in hexadecimal format (as it arrives) in a session table. A session table has been configured to store the value for a configurable period of time (i.e., a few seconds). The session on a network level is being identified by the Source IP and Source Port. This combination is unique and is thus used as the key of the session table of SC1. The session table is used so that the TLS extension value (i.e. MSISDN), that has been fetched in the very beginning of the session (in the first Client Hello packet), will be available until the session ends (i.e. the connection closes). So, this session variable is available as the first HTTP request of the session gets decrypted and can be added, only to this request, as a new header.

SC1 will insert the new header when it forwards the traffic to RC. Note that the routing selection occurs only once in the lifetime of a session, thus the header enrichment will occur only in the first HTTP request towards the server. However, more HTTP requests might follow as part of the same HTTPS packet stream.

SC2 is responsible for enriching the respective header of all HTTP requests that belong to the same HTTPS packet stream before forwarding them to the target server. SC2 creates a session table in its own memory (as it is independent from the session table that is used by the SC1), in order to store the value of the enriched header found in the first HTTP request of the session. Once again, the key of this session table will be the Source IP and Source Port combination.

In a case where the RC is omitted from the described solution, or implemented as part of SC1 or SC2, both SC1 and SC2 could use a shared session table.

All requests arriving at SC2 are unencrypted, since SSL termination has been performed in SC1, which has decrypted the HTTPS packet stream. SC2, before adding the header to all HTTP requests of the session, transforms the enriched value from hexadecimal to a string format. For the first HTTP request it replaces the header with the new readable format, while for the subsequent HTTP requests it adds a new header with the final format of the requested value. The actual header key, added in the solution, is the same. The web application server receives all HTTP requests with the same header key, regardless of whether the enrichment happened by SC1 or SC2.

Tracking of Enrichment Information

Figure 6A:
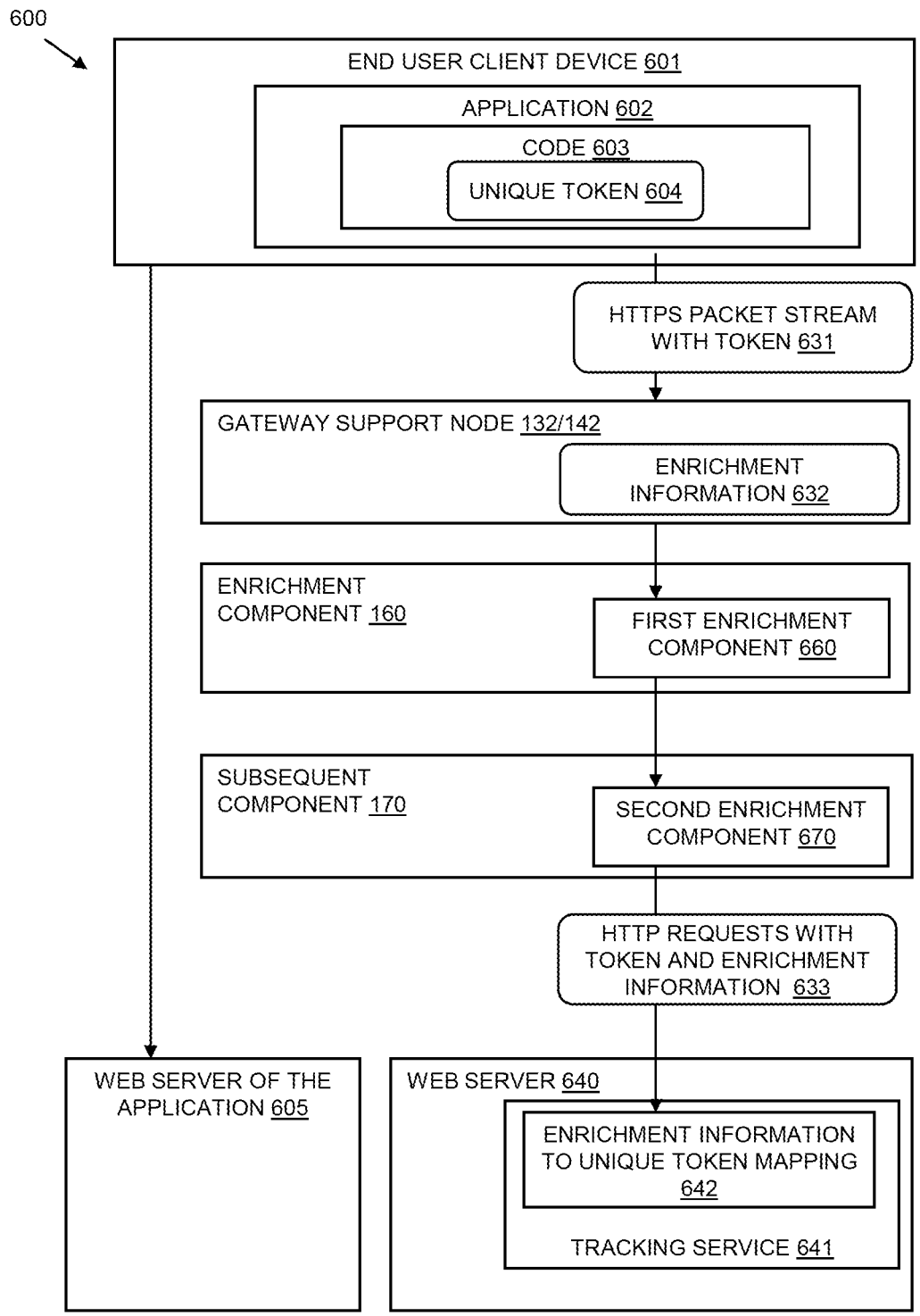
FIG. 6A is a schematic diagram of an example embodiment of an aspect of the described method of tracking enrichment information.
Figure 6B:
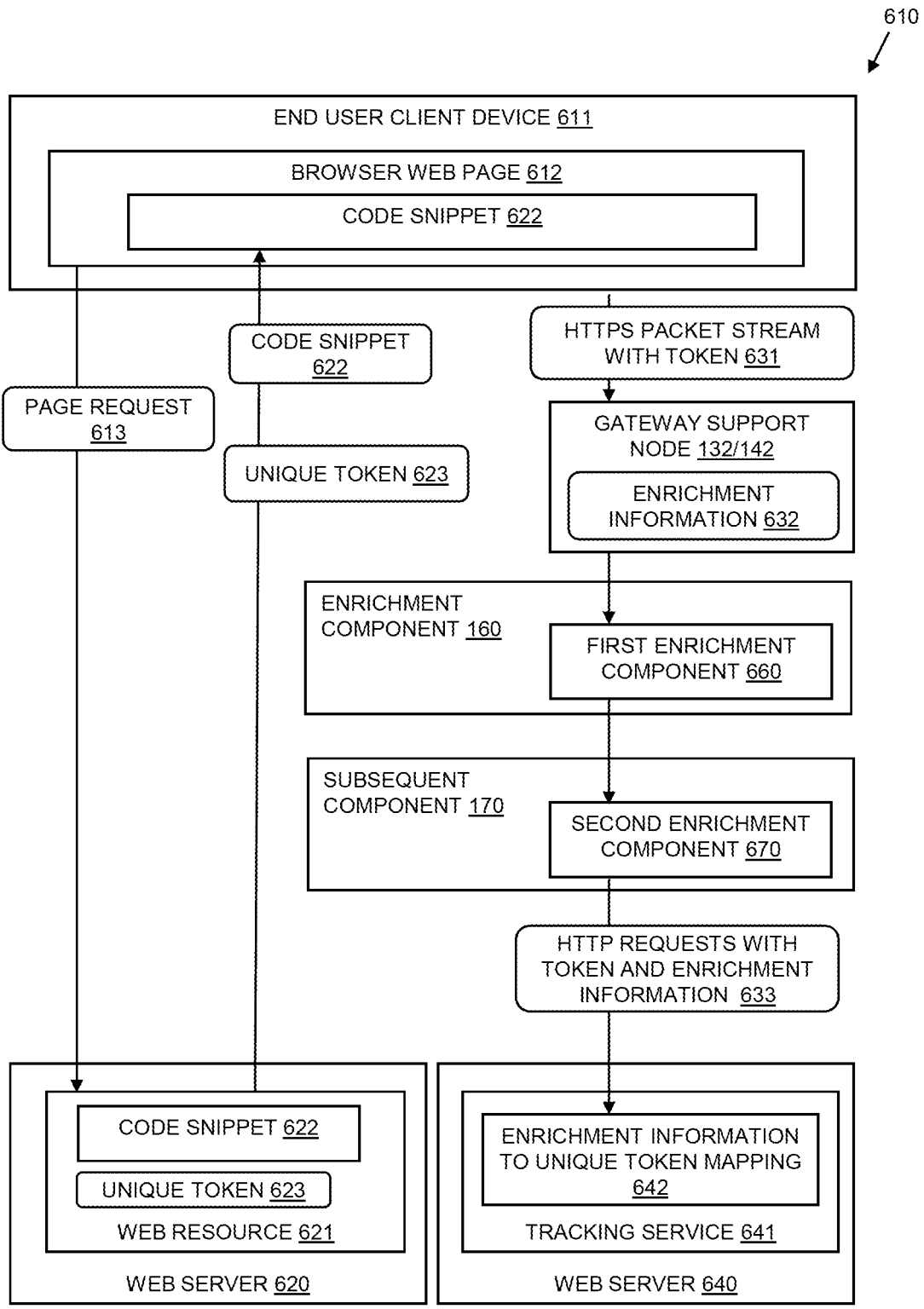
FIG. 6B is a schematic diagram of an example embodiment of another aspect of the described method of tracking enrichment information.

FIGS. 6A and 6B are schematic diagrams (600, 610) showing example embodiments of flow through system components for a tracking of enrichment information of an end user's access to a web resource using the described enrichment method of an HTTPS packet stream. Two example embodiments are described. A first embodiment is shown in FIG. 6A in which an end user client device (601) uses a native application (602) linked to a web server (605) and a second embodiment is shown in FIG. 6B in which an end user client device (611) uses an end user browser (a web browser) to access a browser web page (612). In both embodiments, a tracking service (641) is provided as a web application on a web server (640) for resolving the enrichment information. The enrichment information may be tracked to an end user by the tracking service (641) using a unique token of the end user client device.

Referring to FIG. 6A, a native application (602) on the end user client device (601) may include code (603) for generating a unique token (604) and calling an HTTPS packet stream (631) with the token to a tracking service (641).

The HTTPS packet stream (631) performs a call that uses the unique token (603) as an invocation parameter. The call is forwarded to the enrichment component (160) by a gateway support node (132, 142) that adds enrichment information (632) as a TLS extension as previously described. The enrichment component (160) implements a first enrichment component (660) that resolves the enrichment information to forward it to a second enrichment component (670) at the subsequent component (170) for adding the enrichment information to all the HTTP requests (633) that are sent to the tracking service (641).

The enrichment information (603) is retrieved at the tracking service (641) and the enrichment information (603) is encrypted and stored with mapping (642) to the unique token (604). The tracking service (641) leverages the necessary flows for storing the enrichment information of the end user for a flow and allows the application (602) provider to identify the end users of their resources.

Referring to FIG. 6B, a web resource (621) is provided on a web server (620) providing a web page (612) that can be requested (613) from an end user browser of an end user client device (611). The web resource (621) embeds a code snippet (622), provided by the tracking service (641), on their website which will perform the required calls to the tracking service (641) backend system to enable the enrichment information resolution.

When a web resource (621) receives a request (613) for an HTTPS web page, the web resource (621) generates a unique identifier as a unique token (623) identifying when possible the end user, else the request.

The code snippet (622), through an HTTPS packet stream (631), sends the unique token from the end user browser on the end user client device (611) to the tracking service (641) domain. In this case where the tracking service is a web site, if the end user browser supports JavaScript, the code snippet performs an AJAX call to the tracking service domain, through HTTPS, providing the unique token. If the end user browser does not support JavaScript, the code snippet requests a tracking pixel from the tracking service domain, through HTTPS, providing the unique token.

As with the embodiment of FIG. 6A, the HTTPS packet stream (631) is a call that uses a unique token as an invocation parameter. The call is forwarded to the enrichment component (160) by a gateway support node (132, 142) that adds enrichment information (632) as a TLS extension as previously described. The enrichment component (160) implements a first enrichment component (660) that resolves the enrichment information to forward it to a second enrichment component (670) at the subsequent component (170) for adding the enrichment information to all the HTTP requests (633) that are sent to the tracking service (641). The enrichment information is retrieved at the tracking service (641) and the enrichment information is encrypted and stored with a mapping (642) to the unique token. The tracking service (641) leverages the necessary flows for storing the enrichment information of the end user for a flow and allows the web resource (621) providers to identify the users of their web resources.

The web resource (621) may include a tracking component including: a unique token component for generating a unique token (623) for an end user browser; a code providing component for providing a code snippet (622) or code component to the end user browser to perform a request to a tracking service web application (641) from the end user browser including the unique token; and a tracking information component for obtaining tracking information (e.g. including enrichment information) from the tracking service web application by referencing the unique token.

An end user browser may include: a code receiving component for receiving a code component from a web server when accessing a web page/service; and an executing component for automatically executing the code component at the end user browser to perform a request to a tracking service web application that links enrichment information associated with the request to a unique token provided by the web server. The end user browser performs an HTTPS call including the unique token as an invocation parameter and the tracking service web application receives HTTP requests including the enrichment information that is added as described herein and links the enrichment information to the unique token for tracking purposes.

A tracking service component providing the tracking service (641) may include: a request receiving component for receiving network session (HTTP) requests from an end user client with enrichment information, including a unique token as an invocation parameter; and a mapping component for mapping (642) the enrichment information to the unique token for tracking the enrichment information on behalf of the web service.

Figure 7:
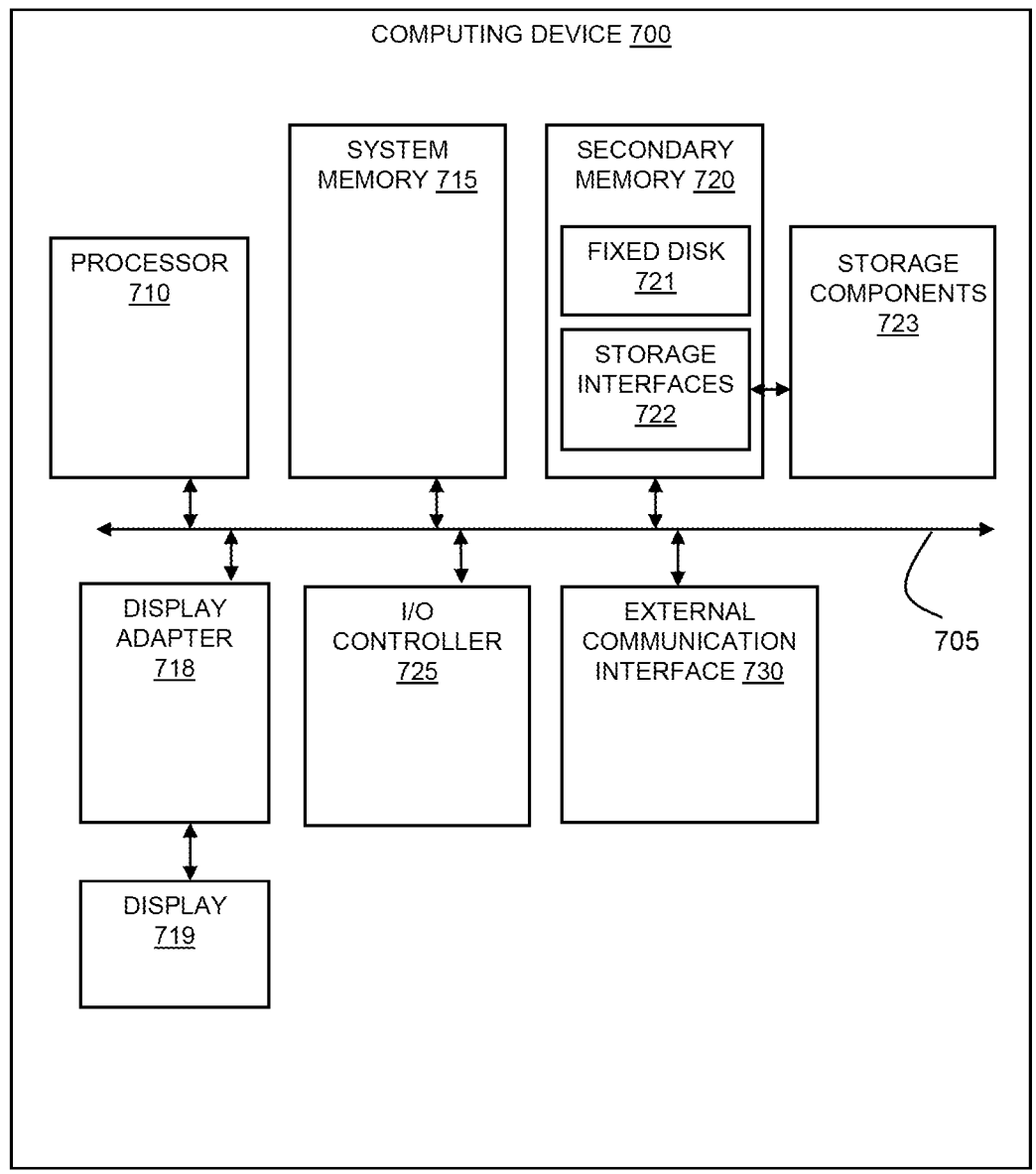
FIG. 7 illustrates an example of a computing device in which various aspects of the disclosure may be implemented.

FIG. 7 illustrates an example of a computing device (700) in which various aspects of the disclosure may be implemented. The computing device (700) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (700) may be suitable for storing and executing computer program code. The various participants and elements in the previously described system diagrams may use any suitable number of subsystems or components of the computing device (700) to facilitate the functions described herein. The computing device (700) may include subsystems or components interconnected via a communication infrastructure (705) (for example, a communications bus, a network, etc.). The computing device (700) may include one or more processors (710) and at least one memory component in the form of computer-readable media. The one or more processors (710) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (700) may be distributed over a number of physical locations (e.g. in a distributed, cluster or cloud-based computing configuration) and appropriate software units may be arranged to manage and/or process data on behalf of remote devices.

The memory components may include system memory (715), which may include read only memory (ROM) and random access memory (RAM). A basic input/output system (BIOS) may be stored in ROM. System software may be stored in the system memory (715) including operating system software. The memory components may also include secondary memory (720). The secondary memory (720) may include a fixed disk (721), such as a hard disk drive, and, optionally, one or more storage interfaces (722) for interfacing with storage components (723), such as removable storage components (e.g. magnetic tape, optical disk, flash memory drive, external hard drive, removable memory chip, etc.), network attached storage components (e.g. NAS drives), remote storage components (e.g. cloud-based storage) or the like. The fixed disk (721) and storage interfaces (722) may optionally be standalone components.

The computing device (700) may include an external communications interface (730) for operation of the computing device (700) in a networked environment enabling transfer of data between multiple computing devices (700) and/or the Internet. Data transferred via the external communications interface (730) may be in the form of signals, which may be electronic, electromagnetic, optical, radio, or other types of signal. The external communications interface (730) may enable communication of data between the computing device (700) and other computing devices including servers and external storage facilities. Web services may be accessible by and/or from the computing device (700) via the communications interface (730).

The external communications interface (730) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (710). A computer program product may be provided by a non-transient or non-transitory computer-readable medium, or may be provided via a signal or other transient or transitory means via the communications interface (730).

Interconnection via the communication infrastructure (705) allows the one or more processors (710) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (700) either directly or via an I/O controller (735). One or more displays (745) (which may be touch-sensitive displays) may be coupled to or integrally formed with the computing device (700) via a display or video adapter (740).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. Components or devices configured or arranged to perform described functions or operations may be so arranged or configured through computer-implemented instructions which implement or carry out the described algorithms or methods. The computer-implemented instructions may be provided by hardware or software units. In one embodiment, a software unit is implemented with a computer program product comprising a non-transient or non-transitory computer-readable medium containing computer program code, which can be executed by a processor for performing any or all of the steps, operations, or processes described. Software units or functions described in this application may be implemented as computer program code using any suitable computer language such as, for example, Java™, C++, or Perin™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations, such as accompanying flow diagrams, are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A computer-implemented method for providing enrichment information using Hypertext Transfer Protocol Secure (HTTPS), the method comprising:
    extracting and storing the enrichment information received in a client handshake initiator packet for negotiating an encryption protocol for a network session of a Hypertext Transfer Protocol Secure (HTTPS) packet stream at a termination of a security protocol in a network;
    removing the enrichment information from a payload of the client handshake initiator packet and adjusting field lengths before carrying out a security handshake;
    obtaining one or more Hypertext Transfer Protocol (HTTP) requests by decrypting the HTTPS packet stream of the network session; and adding the enrichment information as a header to at least a first HTTP request being routed towards a server.

2. The method as claimed in claim 1, wherein the extracting the enrichment information further includes: reading an extension field of the client handshake initiator packet, and
    wherein the storing the enrichment information further includes: storing the enrichment information in a session table with correlation information for the enrichment information.

3. The method as claimed in claim 2, including storing the enrichment information temporarily in the session table for a duration configured to include a duration of the network session and wherein correlation information is session specific information identifying an owner of the client handshake initiator packet.

4. The method as claimed in claim 2, wherein the session table holds key-value pairs, wherein the key is a unique combination of a source Internet Protocol address and source port, and the value is the enrichment information.

5. The method as claimed in claim 1, including converting the enrichment information to a readable format before adding the enrichment information as a header to at least the first HTTP request being routed towards the server.

6. The method as claimed in claim 1, including providing a component at a security protocol termination for extracting and storing the enrichment information and obtaining one or more HTTP requests, and wherein adding the enrichment information as a header adds the enrichment information to all the HTTP requests of the network session being routed towards the server.

7. The method as claimed in claim 1, wherein a first component at a security protocol termination extracts and stores the enrichment information and obtains one or more HTTP requests, and
    wherein the adding the enrichment information as the header further includes:
    adding the enrichment information to only the first HTTP request of the network session and routing the first HTTP request towards the server via a subsequent component, wherein the method includes:
    intercepting the first HTTP request and storing the enrichment information from the header of the first HTTP request for the network session; and
    adding the enrichment information as a header in each subsequent HTTP request for the network session.

8. The method as claimed in claim 7, including at the subsequent component:
    receiving the enrichment information in the first HTTP request in an unconverted form;
    converting the enrichment information to a readable format;
    replacing the enrichment information in the first HTTP request with the converted enrichment information, and
    wherein adding the enrichment information as a header in each subsequent HTTP request adds the converted enrichment information.

9. The method as claimed in claim 7, including at the subsequent component:
    receiving an HTTP request for a network session;
    determining if a header exists in the HTTP request for a header type for the enrichment information;
    if the header exists, converting the existing enrichment information in the header to a readable format; and
    if the header does not exist, adding the enrichment information in a readable format as a header of the header type.

10. The method as claimed in claim 1, wherein the network session is a request from an end user client to a tracking service web application, wherein the request includes a unique token identifying the end user client; and
    wherein the request enables the unique token to be mapped to the enrichment information of the network session at the tracking service web application.

11. The method as claimed in claim 10, wherein the network session is a request from an end user client to a tracking service web application invoked by a code component provided to the end user client by a web server.

12. The method as claimed in claim 1 including a method at a tracking service including:
    receiving an HTTP request with the enrichment information and including a unique token as an invocation parameter, the HTTP request having been obtained by decrypting the HTTPS packet stream of the network session and the enrichment information having been added as a header to the received HTTP request; and
    mapping the enrichment information to the unique token for tracking the enrichment information.

13. The method as claimed in claim 1, including a method at a client including:

sending an HTTPS packet stream including a unique token as an invocation parameter for identifying the client and for mapping to the enrichment information added to the HTTPS packet stream from the client.

14. A system for providing enrichment information using Hypertext Transfer Protocol Secure (HTTPS), the system comprising an enrichment component at a termination of a security protocol in a network, including:
   a first enrichment information receiving component for extracting and storing the enrichment information received in a client handshake initiator packet for negotiating an encryption protocol for a network session of a HTTPS packet stream and for removing the enrichment information from a payload of the client handshake initiator packet and adjusting field lengths before carrying out a security handshake; and
   a first header adding component for obtaining one or more Hypertext Transfer Protocol (HTTP) requests by decrypting the HTTPS packet stream of the network session, and adding the enrichment information as a header to at least the first HTTP request being routed towards a server.

15. The system as claimed in claim 14, wherein the enrichment component includes a converter component for converting the enrichment information to a readable format before adding the enrichment information as the header to at least the first HTTP request being routed towards the server.

16. The system as claimed in claim 14, wherein the enrichment component includes a session table for temporarily storing the enrichment information together with correlation information for the enrichment information for a duration configured to include a duration of the network session.

17. The system as claimed in claim 14, wherein the first header adding component adds the enrichment information as a header to only the first HTTP request and the system further comprising a subsequent component including:
   a second enrichment information receiving component for intercepting the first HTTP request and storing the enrichment information from the header of the first HTTP request for the network session; and
   a second header adding component for adding the enrichment information as a header in each subsequent HTTP request for the network session.

18. The system as claimed in claim 17, including:
   a routing component for routing the first HTTP request of a network session from the enrichment component to the subsequent component.

19. The system as claimed in claim 17, including at the subsequent component:
   a converter component for converting the enrichment information to a readable format;
   a header replacement component for replacing the enrichment information in the first HTTP request with the converted enrichment information; and
   wherein the second header adding component adds the converted enrichment information.

20. The system as claimed in claim 14, including:
   a gateway support node including an enrichment information component for adding the enrichment information to an unencrypted part of a client handshake initiator packet for a network session in a configured extension.

21. The system as claimed in claim 14, wherein the enrichment component is provided in an application firewall network device in a network infrastructure.

22. The system as claimed in claim 17, wherein the subsequent component is provided in a load balancer network device in a network infrastructure.

23. The system as claimed in claim 14, wherein the enrichment component is provided as part of a server infrastructure.

24. The method as claimed in claim 1, including receiving all the HTTPS packet streams of the session and decrypting the packets to extract one or more HTTP requests all belonging to the same HTTPS packet stream, wherein the HTTPS session remains open while packets are exchanged between a client and the server, wherein the enrichment information is received in a Transport Layer Security (TLS) extension of an unencrypted part of a client TLS handshake initiator packet negotiating a TLS protocol for the network session.

25. The method as claimed in claim 5, wherein storing the enrichment information includes storing the converted enrichment information.

26. The method as claimed in claim 1, including:
   instructing a gateway support node to configure a client handshake initiator packet for negotiating a security protocol with the server for a network session to include the enrichment information in a configured extension.

27. The method as claimed in claim 1, wherein the enrichment information is one of the group of: a Mobile Station International Subscriber Directory Number (MSISDN), a User Equipment Internet Protocol Address (UE IP Address), an International Mobile Subscriber Identity (IMSI), an International Mobile Equipment Identity (IMEI), a User Location, an Internet Protocol (IP) Address, a timestamp, a Remote Access Terminal (RAT), an Access Point Name Network Identifier (APN-NI).

28. The system as claimed in claim 14, including a tracking service component including:
   a request receiving component for receiving an HTTP request with the enrichment information and including a unique token as an invocation parameter, the HTTP request having been obtained by decrypting the HTTPS packet stream of the network session and the enrichment information having been added as a header to the received HTTPS request; and
   a mapping component for mapping the enrichment information to the unique token for tracking the enrichment information.

29. The system as claimed in claim 14, including a client component including:
   a request sending component for sending an HTTPS packet stream including a unique token as an invocation parameter for identifying the client and mapping to the enrichment information added to the HTTPS packet stream from the client.

30. The system as claimed in claim 20, wherein the initiator packet is a Client Hello packet of a Transport Layer Security (TLS) handshake and the configured extension is in the unassigned range of TLS extension options.

* * * * *